(12) United States Patent
Crossley (10) Patent No.: US 7,287,783 B2
(45) Date of Patent: Oct. 30, 2007

(54) PLAYER COVER

(75) Inventor: David W. Crossley, Charlestown, RI (US)

(73) Assignee: Elbee Pty Ltd, Bondi Junction NSW (AU)

(*) Notice: Subject to any disclaimer, the term of this patent is extended or adjusted under 35 U.S.C. 154(b) by 37 days.

(21) Appl. No.: 11/213,569

(22) Filed: Aug. 26, 2005

(65) Prior Publication Data

US 2007/0046030 A1 Mar. 1, 2007

(51) Int. Cl.
*E05C 9/10* (2006.01)

(52) U.S. Cl. .................. 292/35; 292/DIG. 37; 361/726; 361/681

(58) Field of Classification Search ............ 292/35, 292/80, DIG. 37, 120–122; 312/273.2; 248/917; 361/681 X, 682, 686, 683, 726 X
See application file for complete search history.

(56) References Cited

U.S. PATENT DOCUMENTS

| | | | |
|---|---|---|---|
| 2,492,262 A | 12/1949 | Boyden et al. | |
| 4,629,089 A | 12/1986 | Federico et al. | |
| 4,896,070 A | 1/1990 | Reid et al. | |
| 4,908,728 A | 3/1990 | Pinkett | |
| 4,922,980 A | 5/1990 | Parker | |
| 4,932,524 A | 6/1990 | Hodson | |
| 4,959,979 A | 10/1990 | Filipow et al. | |
| 4,964,286 A | 10/1990 | Poyer | |
| 5,022,242 A | 6/1991 | Povilaitis | |
| 5,551,497 A | 9/1996 | Stanley | |
| D389,818 S | 1/1998 | Smith | |
| 5,831,811 A | 11/1998 | Van Horn | |
| 6,095,702 A | 8/2000 | Garbacik | |
| 6,529,371 B1* | 3/2003 | Laio .......................... 361/681 |
| 7,067,735 B2* | 6/2006 | Murata ....................... 174/50 |
| 7,120,010 B2* | 10/2006 | Tajima ...................... 361/681 |
| 2003/0178114 A1 | 9/2003 | Enlow et al. | |

* cited by examiner

Primary Examiner—Brian E. Glessner
Assistant Examiner—Mark Williams
(74) Attorney, Agent, or Firm—Wolf Greenfield & Sacks (57) ABSTRACT

A child proof cover for the control panel of equipment such as audio and video players. The cover has a sheet that attaches to the case of the equipment and extends over the control panel. One end of the sheet is detachably connected to the case above the control panel and the other end of the sheet is connected to the case below the control panel by a latch assembly that includes a safety lock. The latch assembly requires several buttons to be simultaneously depressed to lift the sheet off the control panel.

10 Claims, 14 Drawing Sheets

PLAYER COVER

BACKGROUND OF INVENTION

Field of Invention

This invention relates to enclosures for control panels of equipment such as DVD, video, tape and other forms of players and recorders and is particularly intended to prevent young children from gaining access to the controls. The invention typically is supplied in the after market for attachment to the equipment by the equipment owner. Preferably it may be attached to the equipment quickly and without the use of special tools or fasteners.

SUMMARY OF INVENTION

The invention includes a cover typically made of plastic or other sheet material that is sufficiently flexible so that it may conform to the contours of the portion of the case of the equipment to be protected, and is intended to span the control panel and attach at one end to the upper portion of the case and at its other end to the case below the control panel. The one end of the cover preferably may be attached by an adhesive strip and the other end is attached by a latch assembly that preferably is child proof but that easily may be opened by an adult. When the latch assembly is opened, the cover may assume a biased position wherein it lifts off the case to expose the control panel but may readily be deflected down to cover the control panel and remain locked in that position even when the equipment is in operation.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, are meant to encompass the items listed thereafter and equivalents thereof as well as additional items.

Figure 1:
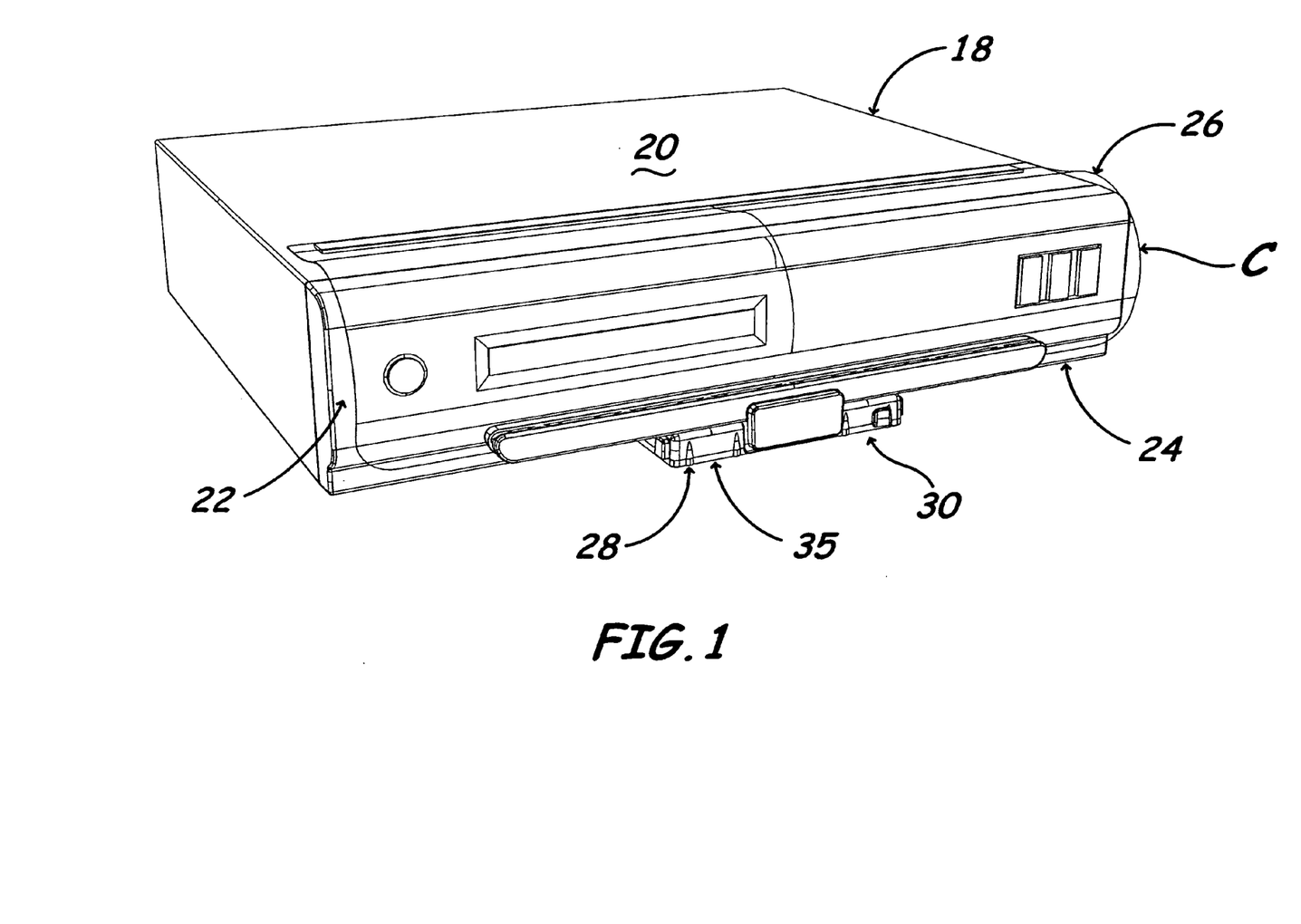
FIG. 1 is a perspective view of one embodiment of the control panel cover of the present invention shown mounted on a DVD player with the cover in the closed position.

The present invention is embodied in a cover to prevent access, particularly by young children, to the control panel of equipment such as audio and video players frequently found in the home. The invention is shown in the drawings applied to a particular shape and style of player, but it is to be appreciated that the invention is not limited specifically to that shape or type of equipment, but rather may be applied with equal benefit to a wide variety of devices, i.e. DVD, Video, tape and other types of electronic and mechanical equipment. The DVD player 18, shown by way of example in FIGS. 1 and 2 as an application for the cover, is generally rectangular in plan view having upper surface 20, front control panel 22 and bottom 24. The protective cover C applied to the player 18 includes a sheet 26 made of plastic or other material, a base plate 28 and a latch assembly 30 that detachably connects the base plate and plastic sheet together. The cover C including the sheet 26, base 28 and latch assembly 30 are shown separately as a unit in FIG. 3. The cover sheet 26 preferably is a clear, rigid PVC, but may also be made of a clear polycarbonate or other comparable material. However, it need not be transparent.

Figure 3:
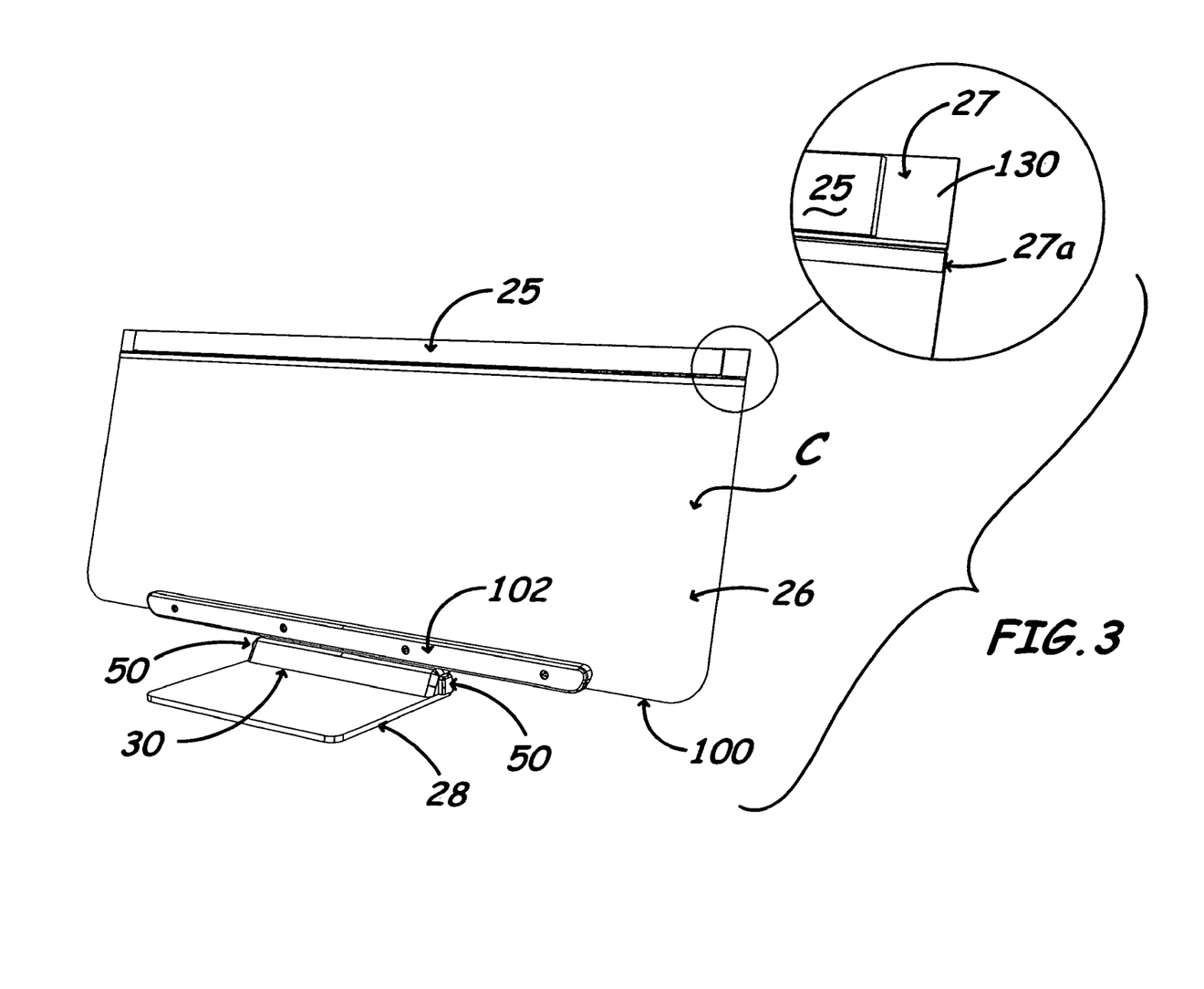
FIG. 3 is a perspective view of the control panel cover detached from the player with the two parts of the latch assembly connected together and further including a blow-up of one edge of the cover.

In FIG. 3 the plastic sheet 26 is shown to carry a strip of adhesive 25 adjacent its end 27, that is used to connect that end to the body of the equipment to which the cover C is attached. The tape may be double faced so that it may be detachably connected to both the body of the equipment 18 and the cover C. It is to be understood that the end 27 of cover C may be connected to the equipment by other types of fasteners as well such as screws, clips, clamps and combinations thereof. Additional details of the end 27 of the cover are provided below.

The base plate 28 in the embodiment shown is a rectangular member that may be molded of plastic or be made of any other suitable rigid materials, and it is attached to the bottom 24 of the player 18. The base may take other shapes. Typical of the materials that may be used are HIPS (high impact polystyrene), ABS (acrylonitrile butadiene styrene) and polycarbonate. ABS is preferred. The plate shown carries on its upper surface 32, a pair of adhesive patches 34 (see FIG. 6) that may be double-faced tape to anchor the plate to the lower surface of the case bottom 24. The double-faced tape would normally be applied to the base plate and the bottom of the player by the equipment owner. Two one inch square pieces of tape may typically be used for this purpose, although obviously other size and shape patches may be used. The tape preferably has approximately a 2 mm (0.080") thick substrate of foam to compensate for irregularities in the surfaces to adhere to one another. The owner is able to select the best location for the tape on the player bottom as the bottom contours of different players vary widely. Alternatively, the plate may be attached by hook and loop fasteners such as Velcro or other devices although preferably the attachments provided to secure the plate to the player 18 may be easily applied without the aid of tools or other instruments so that the cover which is ordinarily purchased as a separate item by the user, may easily be attached to the equipment to be protected. The cover C may, however, be provided as a feature of the equipment 18 by the equipment manufacturer in which event the base plate 28 and the end 27 of the sheet 26 may be more firmly connected to the equipment case.

Figure 4:
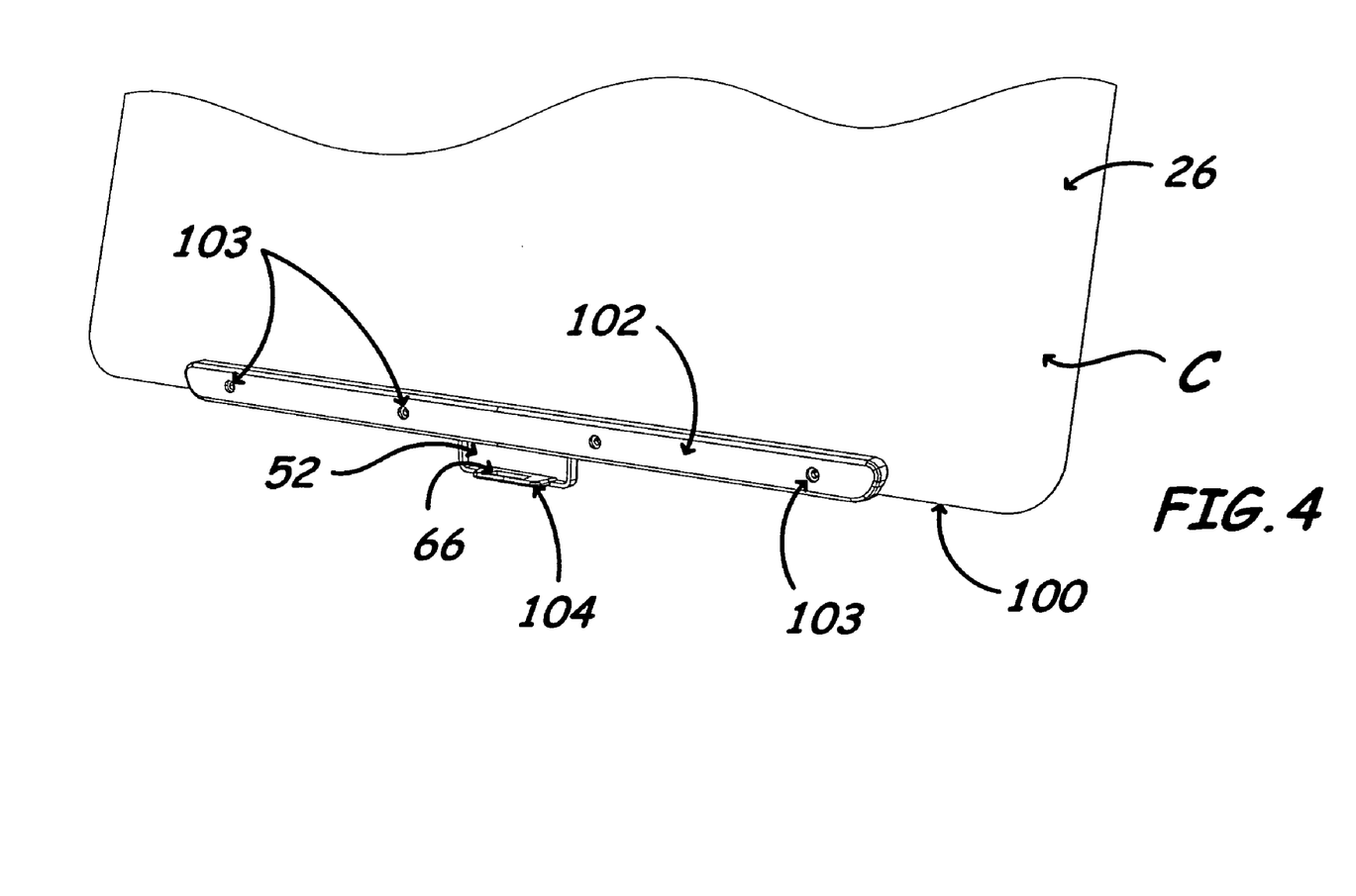
FIG. 4 is a fragmentary perspective view of an embodiment of the latch component of the cover.
Figure 5:
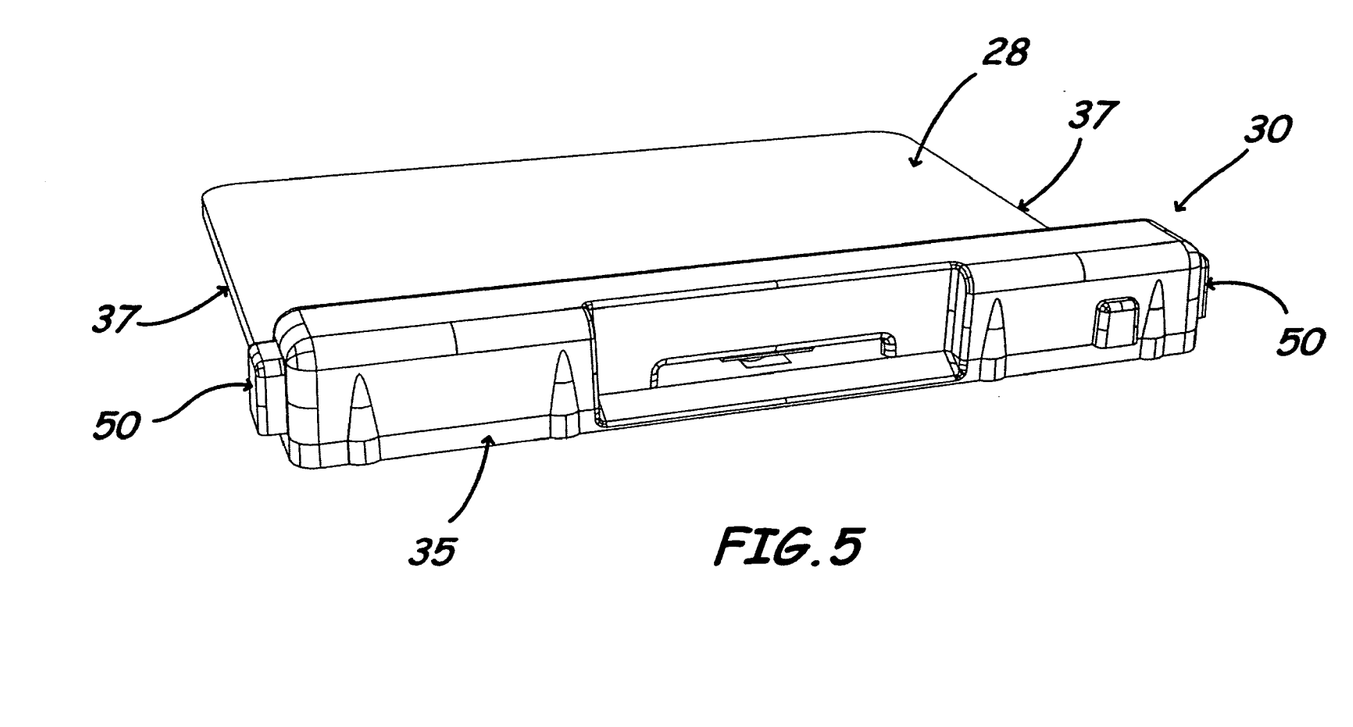
FIG. 5 is a perspective view of an embodiment of the catch subassembly shown secured to the base plate that attaches to the bottom of the player.
Figure 6:
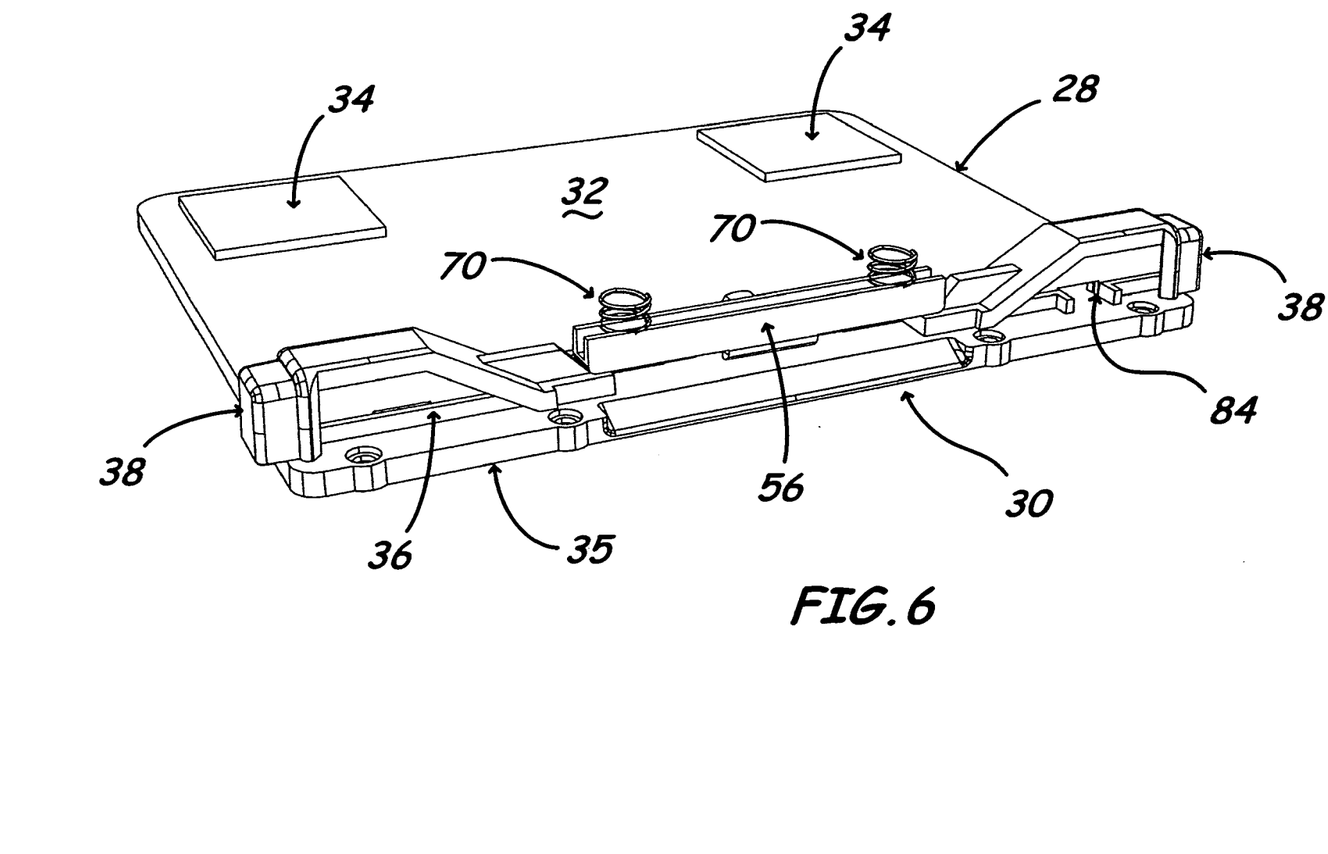
FIG. 6 is a perspective view of the catch subassembly of FIG. 5 with the housing removed to expose the catch mechanism.

The latch assembly 30 is shown in FIGS. 5 and 6 attached to the base plate 28 along the front edge 35 thereof, and when the base plate is mounted to the bottom of the player, the latch assembly 30 is disposed closely adjacent to the control panel 22 at the bottom thereof. The base plate carries two pairs of aligned tracks 36 on its upper surface 32 (see FIG. 8) extending parallel to the front edge 35 of the base plate, and the pairs of tracks are aligned with one another with one disposed adjacent each side 37 thereof. The tracks 36 serve as guides for a pair of actuator buttons 38 and 38a that release the latch assembly and are movable from side-to-side longitudinally in the tracks. Each button 38 has a rib 59 on its lower surface that is disposed between one of the pairs of tracks 36 to guide movement of the buttons toward and away from one another. The buttons are contained in a housing 40 that is secured to the upper surface 32 of the base plate 28 by screws or other fasteners. In the embodiment illustrated, screws (not shown) extend through the holes 42 in the base plate (see FIG. 4) and register with posts 44 (see FIG. 7) on the underside of the housing 40. While the use of posts and screws to secure the housing are shown, it should be appreciated that many other fastening arrangements may be used for that purpose. However, ideally, the housing is detachably mounted on the base plate so that the latching assembly may be easily adjusted or repaired, if necessary.

Figure 9:
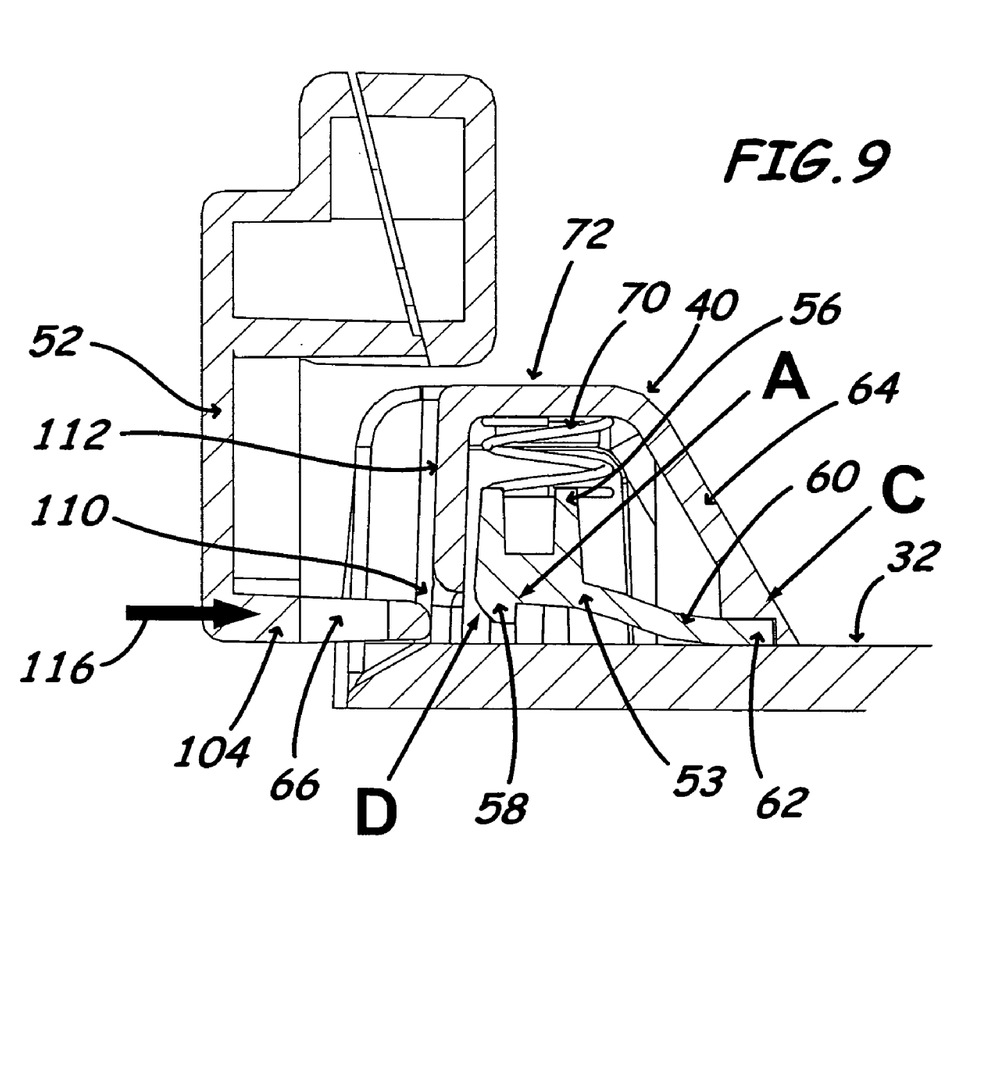
FIGS. 9 and 10 are fragmentary cross-sectional views of the latch assembly shown in the unlocked and locked positions, respectively.

Openings 46 are provided in the end walls 48 of the housing 40 through which the ends 50 of the buttons extend. The actuator buttons may be moved laterally in the tracks 36 to operate the catch 53 in the housing that engages the latch 52 carried on the plastic cover sheet 26. The catch 53 is carried on a beam 56 that is also disposed in the housing 40 (see FIGS. 9 and 10). In the embodiment shown they are integrally formed but the catch 53 may be made separately and subsequently fastened to the beam. The beam 56 in the embodiment shown is U-shaped in cross-section but obviously may take other shapes, and along with the buttons 38 and catch 53 may be molded plastic or any other material having sufficient stiffness to perform their intended functions.

The actuator buttons 38 at their inner ends, carry plates 54 that are disposed below the ends 57 of the beam 56 when the latch mechanism is assembled. The beam 56 is anchored in the housing by means of a leaf spring 60 secured in a slot 62 (see FIGS. 7, 9 and 10) defined by the upper surface 32 of the base plate and the lower edge of the wall 64 of the housing 40. As shown, spring 60 is also formed as an integral part of the beam 56, and the catch 53 is disposed on the beam lower surface. While in this embodiment the catch 53 and leaf spring 60 are shown as integral parts of the beam 56, the parts may be made separately and fastened together.

Figure 10:
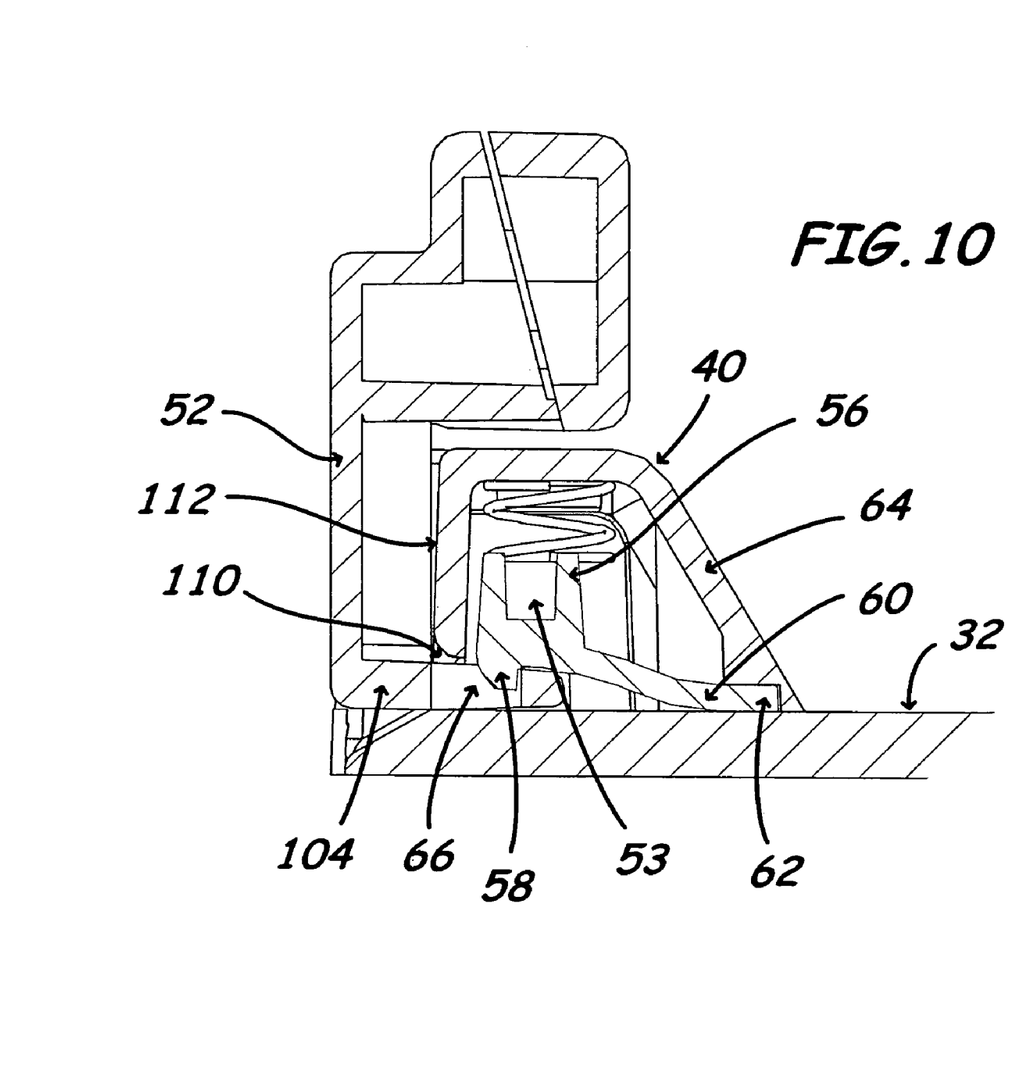
Figure 11:
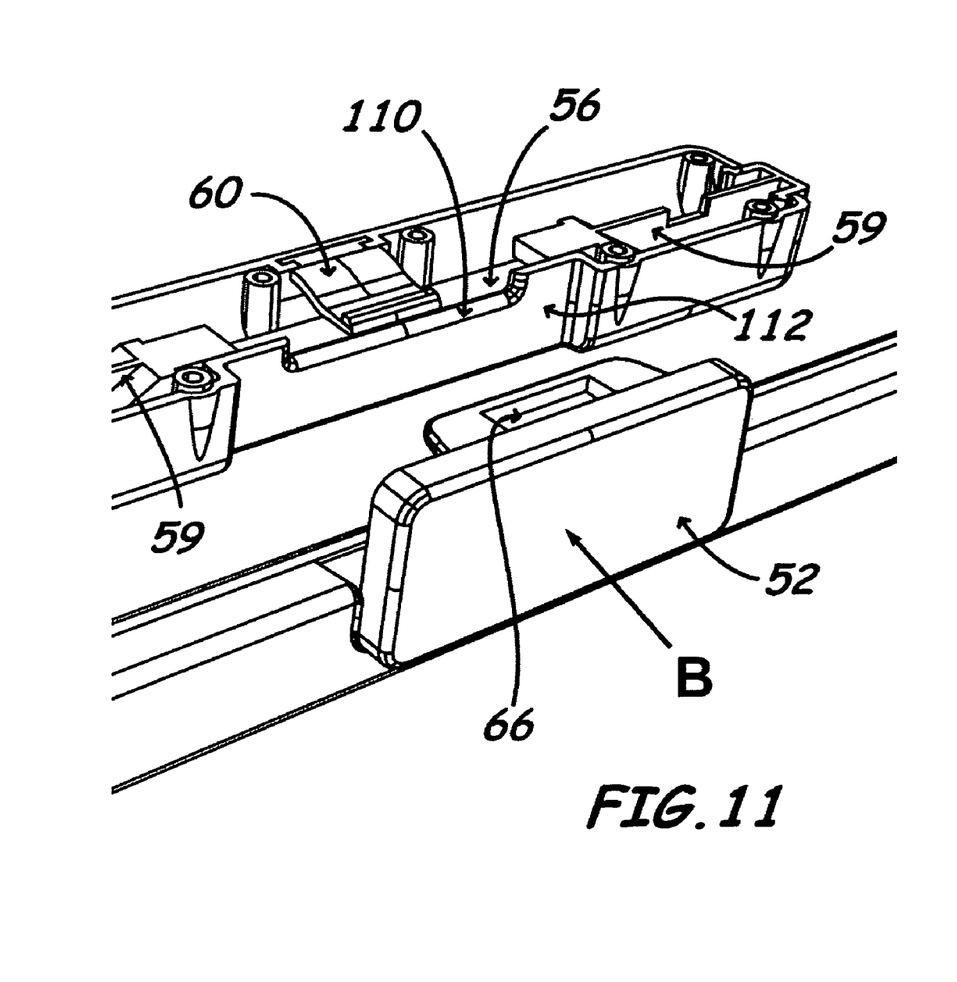
FIGS. 11 and 12 are bottom perspective views of the latch assembly of FIGS. 9 and 10 in the unlocked and locked positions, respectively.
Figure 12:
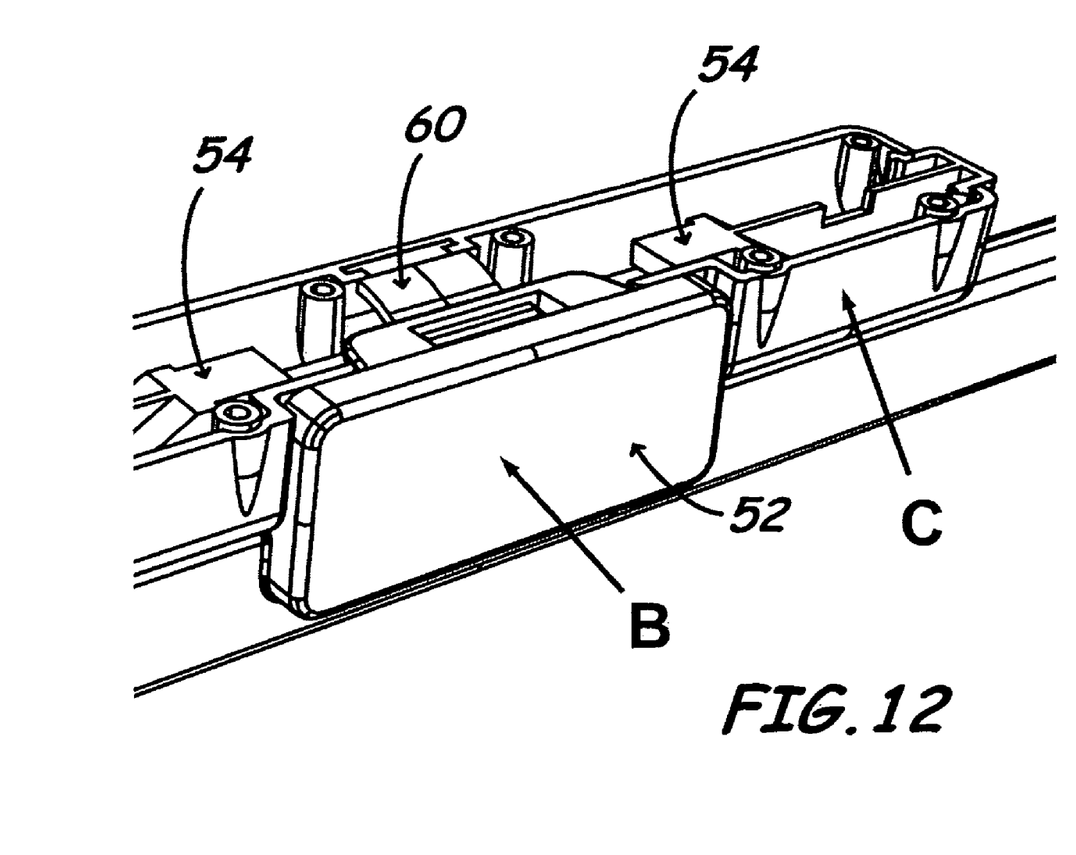

The catch 53 includes a flange 58 designed to engage the margin of an opening 66 in the latch member 52 so as to hold the two parts of the latch assembly in locked condition. The locked position is shown in FIG. 10. To release the latch component 52 and more particularly the margin of opening 66, the beam 56 is elevated to withdraw flange 58 from the opening 66 so that the cover plate C may be moved off the control panel.

In FIGS. 7, 7A, 9 and 10, a pair of coil springs 70 are shown mounted between the upper wall 72 of the housing 40 and the upper surface of the beam 56 so as to urge the beam to a lower position so that in that biased position the catch will engage the latch 52. To raise the beam, the actuator buttons 38 are moved toward one another causing ramps 74 forming part of the buttons to engage the ends 57 of the beam 56 and force the beam upwardly against the bias of the springs 70 and thereby lift the flange 58 of the catch 53 out of the opening 66 and release the latch 52.

Figure 2:
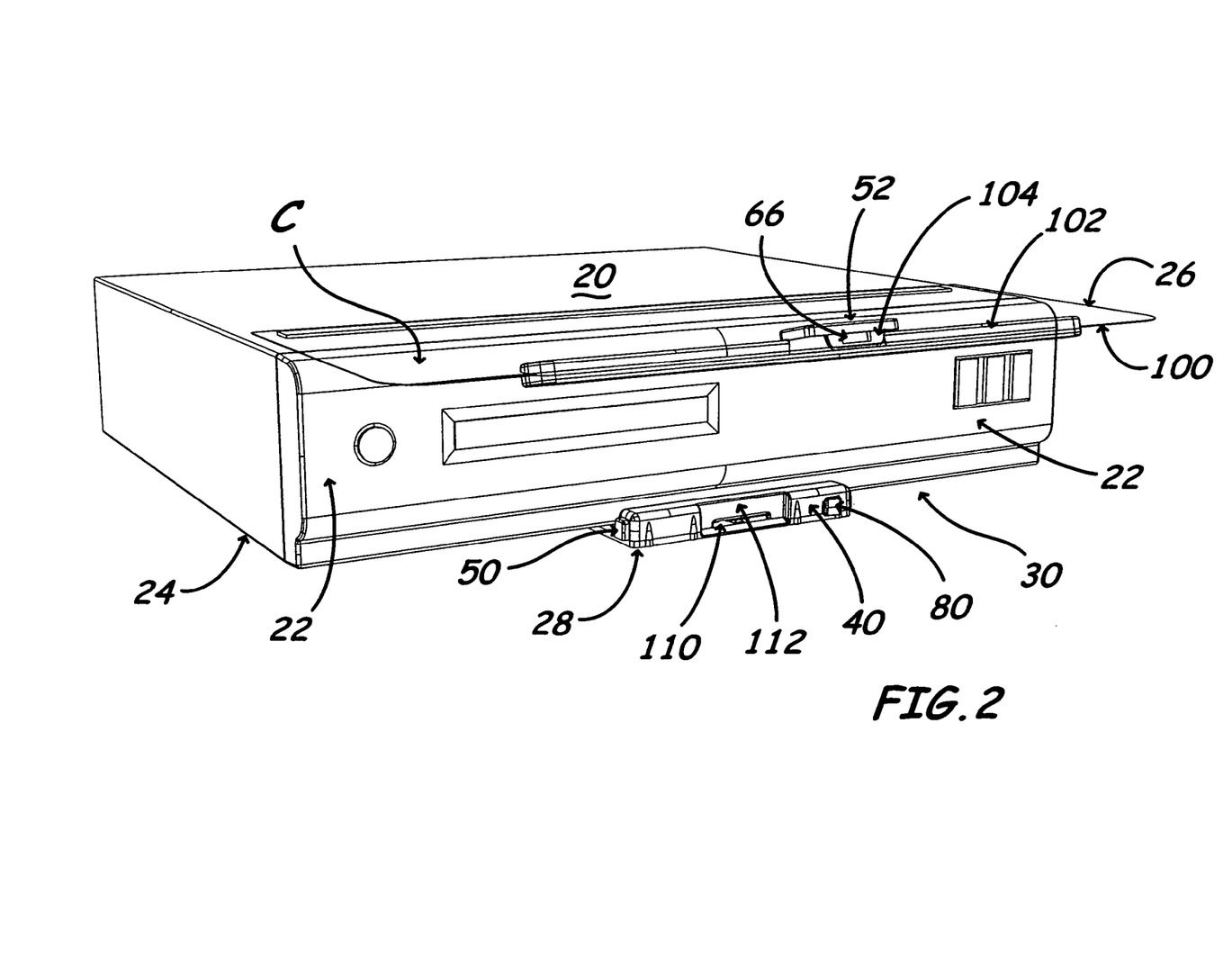
FIG. 2 is a perspective view similar to FIG. 1 but showing the cover in the open position.

The latch component 52 carried on the end 100 of the sheet 26 of the cover C is shown in FIGS. 2 and 4. The component includes a bar 102 permanently secured over the edge 100 of the sheet 26 so as to prevent the edge from being frayed, bent or otherwise mutilated. The attachment may be made by screws 103 as suggested in FIGS. 3 and 4, or by adhesive or any other form of fastener. In the embodiment shown, the bar 102 covers a substantial portion of the edge 100 and carries the latch 52 which may be formed as an integral part of the bar. The latch includes a finger 104 that contains the opening 66 which receives the flange 58 of catch 53 when the cover C is locked in place to cover the control panel 22 of the equipment. To lock the latch assembly, the finger 104 is simply inserted into the opening 110 at the bottom of the front wall 112 of the housing 72 as suggested by the arrow 116 in FIG. 9. The end of the finger 104 will engage the lower rounded corner 58a of the flange 58 of the catch so that the flange will ride over the end of the finger as the beam rises and then drop into the opening 66 to secure the latch assembly in the locked condition.

Figure 7:
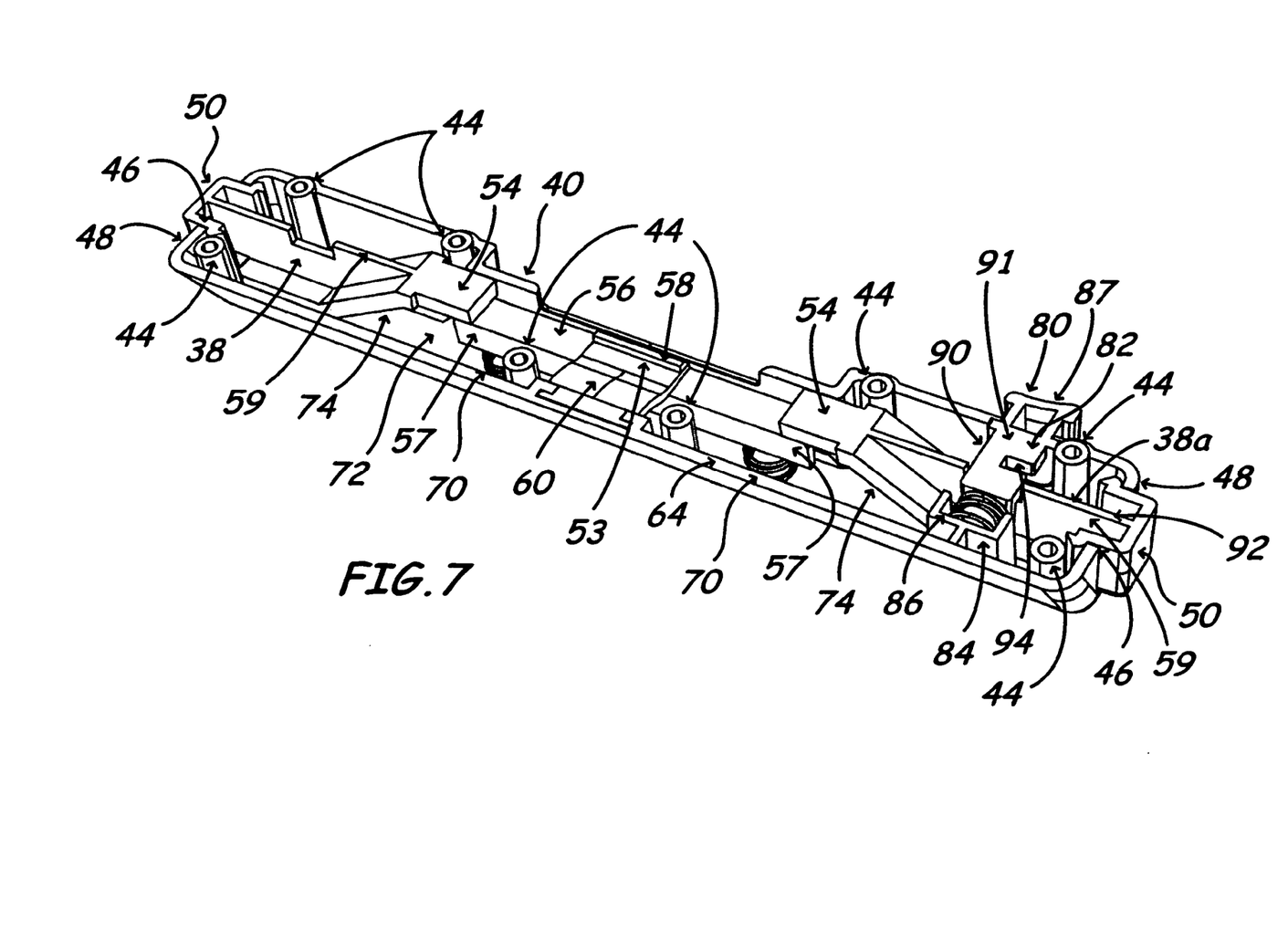
FIG. 7 is an inverted perspective view of the catch subassembly detached from the base plate.
Figure 7A:
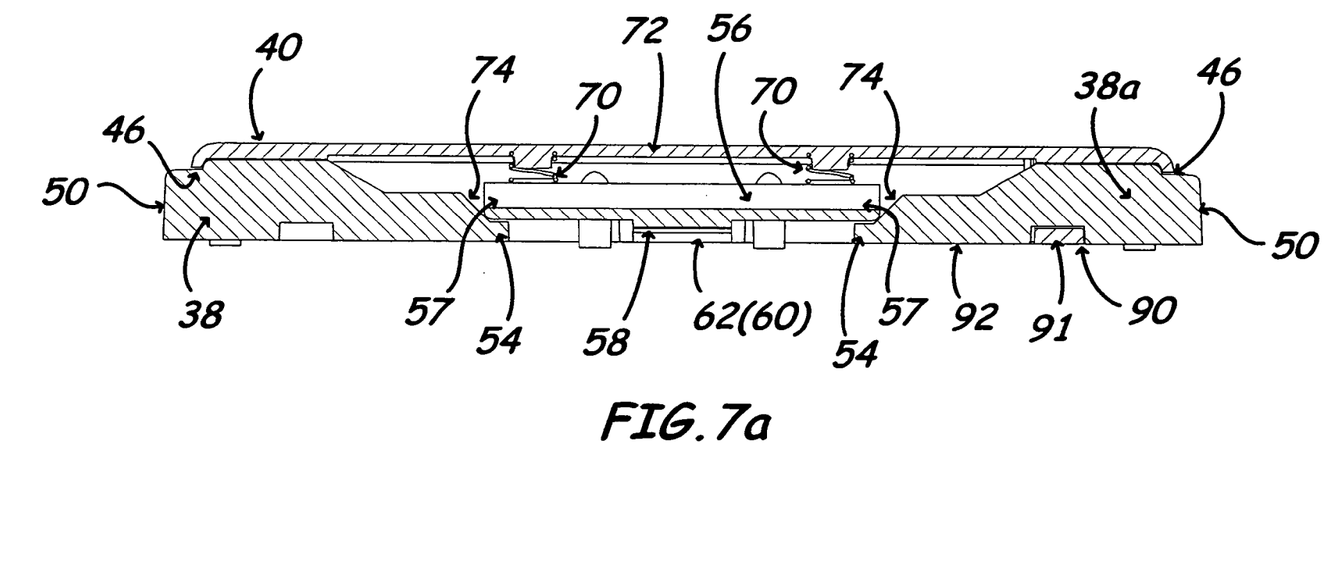
FIG. 7A is a longitudinal cross-sectional view of the catch sub-assembly shown in FIG. 7, in the upright position.
Figure 8:
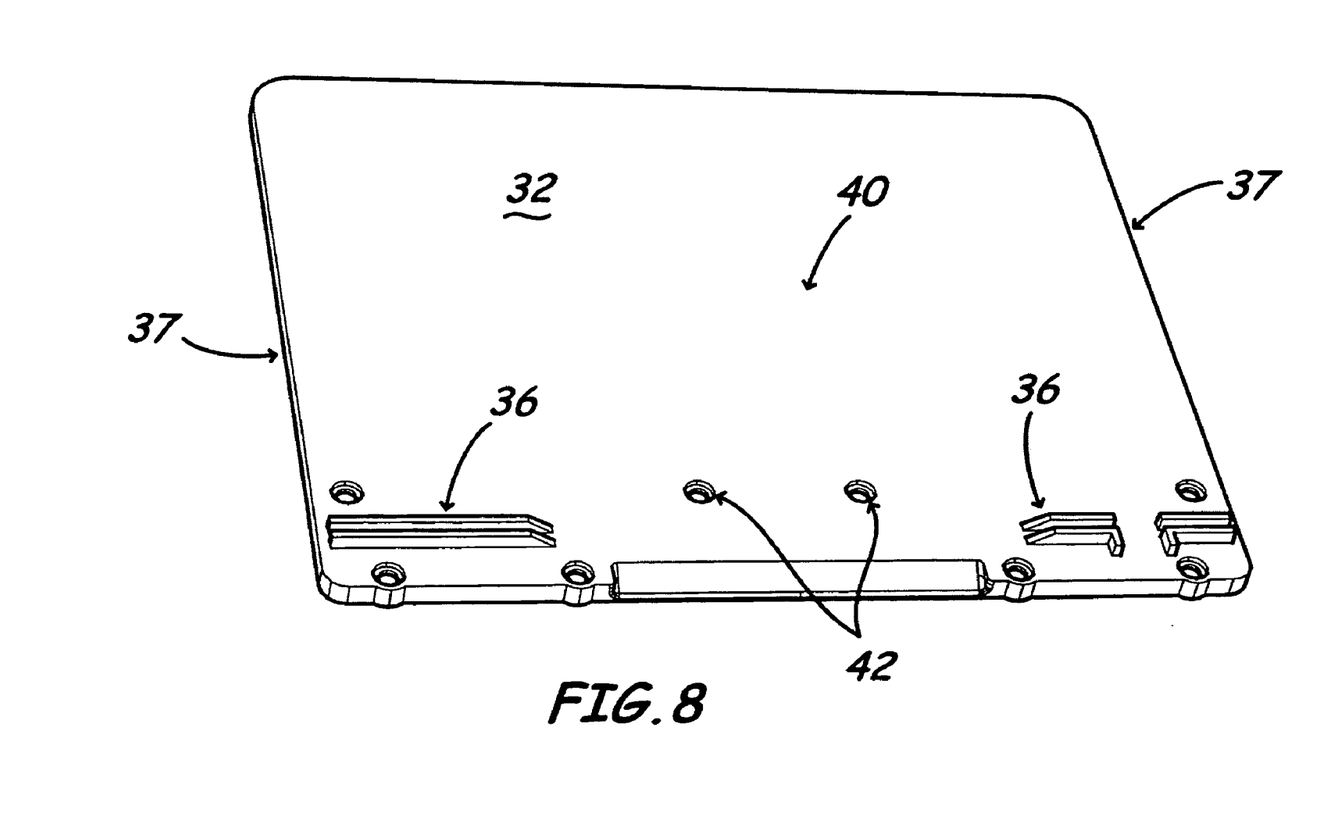
FIG. 8 is a top perspective view of an embodiment of the base plate of the catch assembly.
Figure 8A:
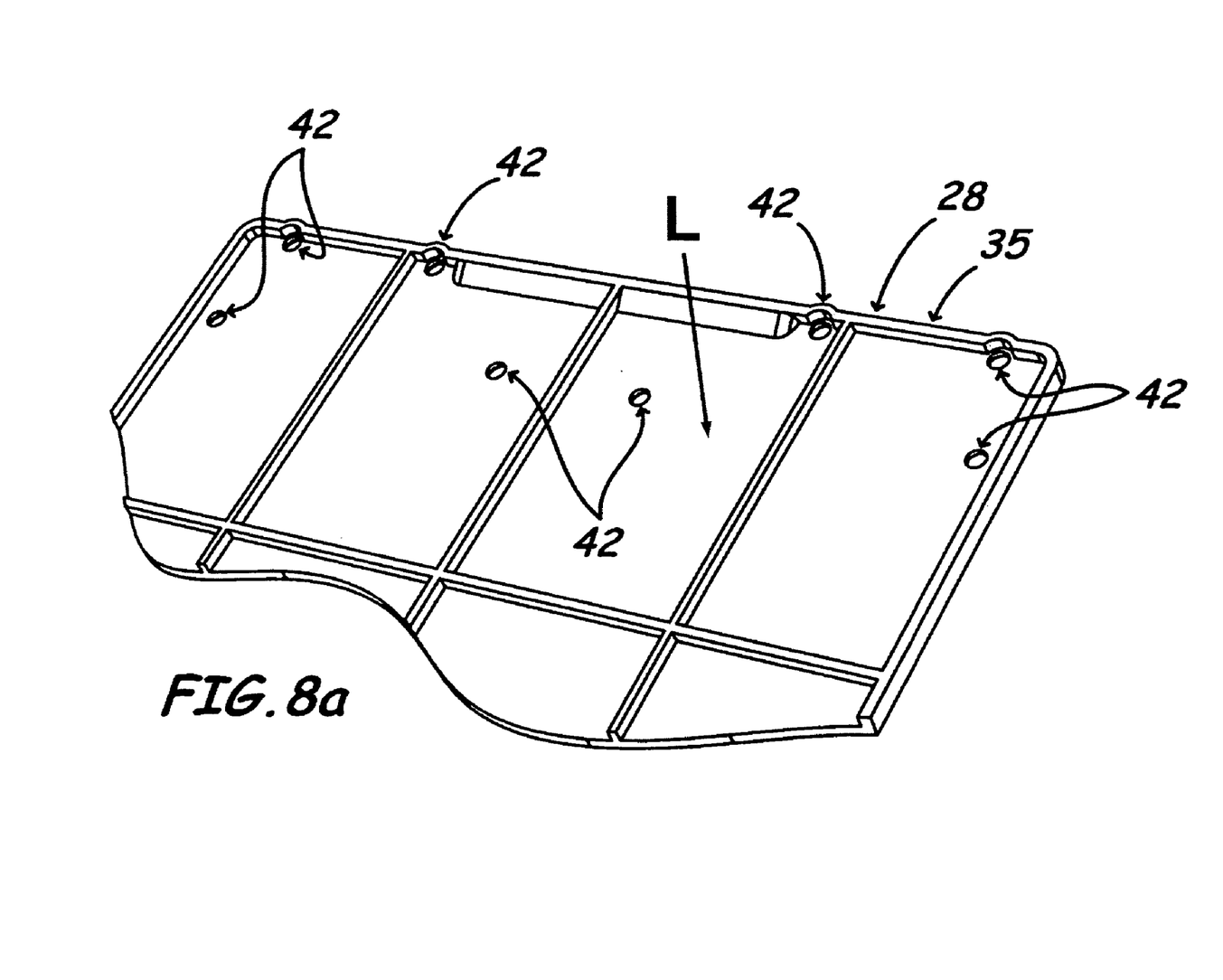

To increase the difficulty of opening the latch assembly so that a young child cannot do so and gain access to the control panel, a safety lock 80 is incorporated into the mechanism. In the embodiment illustrated the safety lock is operatively connected to the actuating button 38a on the right side of the cover C as viewed from the front of the case 18. Details of the safety lock 80 are shown in FIGS. 7 and 7A. The safety lock includes a lock button 82 that is mounted in the housing 40 across the path of travel of the right actuator button 38a and in its biased position the lock button prevents the actuator button from being depressed. The position of the lock button is established by a partition 84 in the housing 40 which captures a spring 86 that in turn urges the lock button 82 to an outer biased position to prevent movement of the actuator button 38a. The lock button 82 has a plate 91 that extends across the bottom of the path of travel of the actuator button 38a and rests in a slot 90 in the lower edge 92 of that actuator button. When the lock button is in the biased position established by the spring 86, a slot 94 in the plate 91 is misaligned with the lower edge 92 of the actuator button 38a and prevents the actuator button from moving. When the button 82 is depressed, the slot 94 of the safety lock is moved into alignment with the bottom edge 92 of the actuator button 38a and allows that button to move so that its ramp 74 can raise that end of the beam 56. To open the cover C, the safety lock button 82 must be depressed and simultaneously the two actuator buttons 38 and 38a must be depressed so as to lift the beam 56 and the flange 58 of catch 53 carried by the beam out of the latch. To close the latch assembly, it is only necessary to push the finger 104 of the latch 52 into the slot 110 as suggested by arrow 116 in FIG. 9 until the catch 53 engages the opening 66 in the latch. It will be appreciated that the opening 66 is released, the stiffness of the plastic sheet 26 will cause it to uncurl and draw the finger 104 from the latch mechanism.

In FIG. 3, an improved detail of cover plate 26 is shown. In accordance with this aspect of the invention, additional flexibility is imparted to the end 27 of the sheet 26 carrying the adhesive tape 25. This is achieved by attaching to the end 27a a strip 130 made of a less rigid material than the main body of the sheet, such as a soft PVC, and the adhesive strip 25 or other fastener to be employed to anchor the end 27 may be mounted on the strip. The double-faced adhesive tape 25 is shown applied to the strip 130. The tape 25 may include a foam substrate or carrier to accommodate irregularities in the surface of the player. This tape may be factory installed or installed later by the purchaser. It may be approximately 0.5 inch wide and the foam may be 1-1.5 mm (0.040-×0.060) thick. By using the more flexible material to carry the adhesive tape, less force will be applied to the adhesive that may cause it to separate from surface 20 of the case 18 of the equipment being protected when the sheet 16 is lifted to expose the control panel. The flexible strip 130 may be attached by overlapping it with the edge of the rigid sheet and heat sealing the two together.

Having thus described several aspects of at least one embodiment of this invention, it is to be appreciated various alterations, modifications, and improvements will readily occur to those skilled in the art. For example, while one embodiment of the latch assembly has been described in detail, different latching devices may be employed. The device should, however, be essentially child proof, yet readily operated by an adult and be of sufficient strength so as to hold the lower end of the cover in place. Such alterations, modifications, and improvements are intended to be part of this disclosure, and are intended to be within the spirit and scope of the invention. Accordingly, the foregoing description and drawings are by way of example only.

What is claimed is:

1. A cover for a control panel of equipment housed in a case comprising,
    a sheet of material carrying a connector at one end for connecting that end of the sheet to a surface of the case and enabling the sheet to extend from the connector over the control panel,
    a latching assembly for connecting the other end of the sheet to the case on the side of the control panel opposite the connector,
    said latching assembly including,
        a latch fixed to the end of the sheet opposite the connector,
        a plate connectable to the bottom of the case and carrying a housing disposed in an exposed position adjacent the bottom of the case,
        a catch in the housing for engaging the latch,
        an actuator movable within the housing for moving the catch to disengage the latch so that the end of the sheet holding the latch can be moved away from and uncover the control panel, said actuator including a pair of buttons remote from one another,
        and a manually operated lock in the housing engaging the actuator for preventing the actuator from causing the catch to disengage the latch, said lock including a third button that must be actuated to enable the pair of buttons to be moved.

2. The childproof cover as defined in claim 1 wherein the sheet is made of a flexible plastic material.

3. The childproof cover as defined in claim 1 wherein the housing is detachably mountable on the case.

4. A cover for a control panel of an instrument housed in a case comprising,
    a sheet of material carrying a connector at one end for connecting that end of the sheet to the surface of the case and enabling the sheet to extend from the connector over the control panel,
    a latching assembly for connecting the other end of the sheet to the case on the side of the control panel opposite the connector,
    said latching assembly including,
        a latch connected to the end of the sheet opposite the connector,
        a catch member for mounting to the case below the control panel and having an opening for receiving the latch member,
        a projection on the catch member biased to a position to engage the latch,
        an operating member connected to the catch for causing the projection to release the latch, said member includes a pair of spaced apart actuators both of which must be simultaneously activated to release the latch,
        and a safety lock operatively connected to the member for preventing operation of the actuators until the lock is activated.

5. The cover as defined in claim 4 wherein the actuators are buttons in the latch assembly.

6. The cover as defined in claim 5 wherein the safety lock is biased to a position to prevent operation of the actuator and is moved away from the biased position by depressing a button carried by the lock.

7. The cover as defined in claim 4 wherein the sheet is a plastic material having portion made of a relatively soft plastic material that serves as a hinge for the sheet adjacent the connector.

8. The cover as defined in claim 4 wherein the connector at one end is double-faced adhesive tape.

9. The cover as defined in claim 4 wherein the cover is transparent.

10. The cover as defined in claim 4 wherein the cover is made of a flexible plastic material.

* * * * *